United States Patent Office 3,393,991
Patented July 23, 1968

3,393,991
HERBICIDAL COMPOSITION AND METHOD
Philip C. Hamm, Glendale, Mo., assignor to Monsanto Company, St. Louis, Mo., a corporation of Delaware
No Drawing. Continuation of application Ser. No. 591,446, Nov. 2, 1966. This application Nov. 7, 1967, Ser. No. 681,297
20 Claims. (Cl. 71—86)

ABSTRACT OF THE DISCLOSURE

Compositions comprising N-isopropyl-α-chloroacetanilide and a triazine selected from the group consisting of (1) 2,4 - bis(3 - methoxypropylamino)-6-methylthio-s-triazine, (2) 2,4-bis(isopropylamino) - 6 - methylthio-s-triazine, (3) 2,4-bis(isopropylamino)-6-methylthio-s-triazine phosphoric acid salt, and (4) mixtures thereof, said triazine being present in an amount from about 1 to about 100 parts by weight per 10 parts by weight of N-isopropyl-α-chloroacetanilide. The compositions have herbicidal utility.

---

This application is a continuation of copending application Ser. No. 591,446, filed Nov. 2, 1966, which in turn is a continuation-in-part of applications Ser. No. 390,269, filed Aug. 14, 1964, both now abandoned, and Ser. No. 391,015 and Ser. No. 391,028, both filed Aug. 20, 1964, and now abandoned.

This invention relates to herbicidal compositions and to methods of controlling or modifying the growth of plants.

The term "plant" as used herein and in the appended claims means dormant propagules, viable propagules, seedlings and established vegetation including the roots and above-ground portions.

N-isopropyl-α-chloroacetanilide has useful herbicidal properties. However, the use of N-isopropyl-α-chloroacetanilide as a herbicide is severely restricted since it is toxic only to a few genera of weed plants. Various triazines are known to possess herbicidal activity but generally only at application rates at which they are highly toxic to many crop plants.

In accordance with this invention it has been discovered that herbicidal compositions comprising N-isopropyl-α-chloroacetanilide and certain triazines exhibit herbicidal effectiveness not possessed by either component employed alone. The herbicidal compositions of this invention produce herbicidal results substantially greater than the sum of the results for each component alone. In addition, the herbicidal compositions are surprisingly selective. They are non-toxic to many crop plants, particularly cotton, corn and soybeans, and thus can be used in the control of both monocotyledonous and dicotyledonous weed plants in crops.

The herbicidal compositions of this invention comprise N-isopropyl-α-chloroacetanilide and a triazine selected from the group consisting of (1) 2,4 - bis(3 - methoxypropylamino)-6-methylthio-s-triazine,
(2) 2,4-bis(isopropylamino)-6-methylthio-s-triazine,
(3) 2,4-bis(isopropylamino)-6-methylthio-s-triazine phosphoric acid salt, and
(4) mixtures thereof, said triazine being present in an amount from about 1 to about 100 parts by weight per 10 parts by weight of N-isopropyl-α-chloroacetanilide. Monocotyledonous plants are most effectively controlled with herbicidal compositions containing from about 1 to about 15 parts by weight of triazine per 10 parts by weight of acetanilide. Dicotyledonous plants are most effectively controlled with herbicidal compositions containing from about 15 to about 100 parts of triazine per 10 parts of acetanilide.

For the sake of brevity and simplicity, the term "active ingredient" is used hereinafter in this specification to describe the herbicidal N-isopropyl-α-chloroacetanilide/triazine compositions of this invention.

In practicing the phytotoxic or herbicidal methods of this invention the active ingredients can be used alone or in combination with a material referred to in the art as a phytotoxic adjuvant in liquid or solid form. Herbicidal formulations are prepared by admixing the active ingredient with an adjuvant including diluent, extenders, carriers and conditioning agents to provide compositions in the form of finely-divided particulate solids, granules, pellets, solutions, dispersions or emulsions. Thus the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of active ingredient.

Typical finely-divided solid carriers and extenders which can be used with the active ingredients include for example, the talcs, clays, pumice, silica, diatomaceous earth, quartz, fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example, kerosene, Stoddard solvent, hexane, water, benzene, toluene, acetone, ethylene dichloride, xylene, alcohols, diesel oil, glycols and the like.

Herbicidal formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The following examples will illustrate the invention. In these examples, as well as in the specification and appended claims, parts and percent are by weight unless otherwise indicated.

Example 1

The herbicidal activity of the active ingredients of this invention is demonstrated as follows: A good grade of top soil is placed in 9½" x 5¾" x 2¾" aluminum pans and compacted to a depth of ⅜" from the top of each pan. A predetermined number of seeds of each of various plant species are placed on top of the soil in the pans. The seeds are covered with a ⅜" layer of prepared soil and the pans leveled. The active ingredients are applied by spraying the surface of the top layer of soil, prior to watering the seeds, with aqueous dispersions containing a sufficient amount of active ingredient to obtain the desired rate per acre on the soil surface. Each component of the active ingredient is also sprayed separately on the soil in different pans by the same method.

The seed containing pans are placed on a wet sand bench and maintained for 14 days under ordinary conditions of sunlight and watering. The plants are observed at the end of fourteen days and the results recorded. The herbicidal activity index is based on the average percent germination of each seed lot. The activity index is converted to a relative numerical scale for the sake of brevity and simplicity in the examples.

The herbicidal activity index used is defined as follows:

| Average percent germination: | Numerical scale |
|---|---|
| 76 to 100 | 0 |
| 51 to 75 | 1 |
| 26 to 50 | 2 |
| 0 to 25 | 3 |

The results of replicate tests are averaged and are given below in Tables I, II and III.

In Table I below the various seeds are represented by letters as follows:

(a) Wild oat
(b) Brome grass
(c) Rye grass
(d) Sugar beet
(e) Wild buckwheat
(f) Rice
(g) Smartweed
(h) Lamb's-quarters The herbicidal compositions of this invention were evaluated for control of foxtail, crabgrass, barnyard grass and pigweed and found to have "3" ratings for all of these weed plants. The herbicidal compositions were also evaluated by identical procedures on cotton and corn, and were found to be completely non-toxic to these significant crop plants. Furthermore, various weed plants growing in soybeans were completely controlled with the herbicidal compositions of this invention without seriously inhibiting the soybean crop, particularly with the compositions in which the triazines were the major component.

As mentioned hereinbefore the herbicidal compositions of this invention can be admixed with one or more phytotoxic adjuvants which can be solid or liquid extenders, carriers, diluents, conditioning agents and the like. Preferred herbicidal formulations containing the active ingredients of this invention have been developed so that the active ingredients can be used to the greatest advantage to modify the growth of plants in soil. The preferred TABLE I.—HERBICIDAL ACTIVITY OF N-ISOPROPYL-α-CHLOROACETANILIDE (A)/2,4-BIS(3-METHOXYPROPYLAMINO)-6-METHYLTHIO-s-TRIAZINE (B)

| Plant | Compound B | | | Compound A | | Compounds B+A | | | |
|---|---|---|---|---|---|---|---|---|---|
| | 1 lb./a | 2 lbs./a | 4 lbs./a | 0.5 lb./a | 1 lb./a | 1+0.5 lbs./a | 2+0.5 lbs./a | 2+1 lbs./a | 4+1 lbs./a |
| (a) | 0 | 0 | 0 | 0 | 0.3 | 0.5 | 1.5 | 3.0 | 2.5 |
| (b) | 0 | 0 | 0.5 | 0.8 | 1.4 | 2.5 | 1.5 | 3.0 | 2.5 |
| (c) | 0.5 | 0 | 0 | 0.5 | 1.6 | 1.0 | 2.5 | 3.0 | 3.0 |
| (d) | 0 | 0 | 1.0 | 0.5 | 0.1 | 1.0 | 1.0 | 1.0 | 2.0 |
| (e) | 0.5 | 1.0 | 1.5 | 0.3 | 0.5 | 0.5 | 1.0 | 2.0 | 2.0 |
| (f) | 0.5 | 0.5 | 0 | 0.2 | 1.3 | 1.0 | 2.0 | 3.0 | 2.5 |
| (g) | 0 | 0 | 0.5 | 0 | 0.2 | 0 | 2.0 | 2.0 | 1.5 |
| (h) | 1.0 | 0.5 | 1.5 | 1.0 | 1.1 | 2.5 | 3.0 | 3.0 | 3.0 |

In Table II below the various seeds are represented by letters as follows:

(a) Wild oat
(b) Brome grass
(c) Rye grass
(d) Wild buckwheat
(e) Tomato
(f) Sorghum
(g) Rice formulations comprise certain wettable powders, aqueous suspensions, dust formulations, granules, emulsifiable oils and solutions in solvents. In general, these preferred formulations can all contain one or more surface-active agents.

Surface-active agents which can be used in the herbicidal formulations of this invention are set out, for example, in Searle, U.S. Patent 2,426,417, Todd, U.S. Patent 2,655,447, Jones, U.S. Patent 2,412,510 and Len- TABLE II.—HERBICIDAL ACTIVITY OF N-ISOPROPYL-α-CHLOROACETANILIDE (A)/2,4-BIS(ISOPROPYLAMINO)-6-METHYLTHIO-s-TRIAZINE (C)

| Plant | Compound C | | Compound A | Compounds C+A | |
|---|---|---|---|---|---|
| | 1 lb./a | 2 lbs./a | 1 lb./a | 1+1 lbs./a | 2+1 lbs./a |
| (a) | 0 | 0.5 | 0.3 | 3.0 | 2.5 |
| (b) | 1.5 | 1.5 | 1.4 | 3.0 | 3.0 |
| (c) | 0.5 | 1.5 | 1.6 | 3.0 | 3.0 |
| (d) | 2.5 | 2.5 | 0.5 | 3.0 | 3.0 |
| (e) | 2.0 | 1.5 | 0.1 | 3.0 | 3.0 |
| (f) | 1.0 | 2.0 | 0.4 | 2.5 | 2.5 |
| (g) | 0 | 0 | 1.3 | 2.5 | 2.5 |

In Table III below the various seeds are represented by letters as follows:

(a) Morning glory
(b) Wild oat
(c) Brome grass
(d) Rye grass
(e) Sugar beet
(f) Wild buckwheat
(g) Sorghum
(h) Rice her, U.S. Patent 2,139,276. A detailed list of such agents is also set forth by J. W. McCutcheon in "Soap and Chemical Specialties," November 1947, p. 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general less than 50 parts by weight of the surface active agent is present per 100 parts by weight of herbicidal formulation.

Wettable powders are water-dispersible compositions containing one or more active ingredients, an inert solid TABLE III.—HERBICIDAL ACTIVITY OF N-ISOPROPYL-α-CHLOROACETANILIDE (A)/2,4-BIS(ISOPROPYLAMINO)-6-METHYLTHIO-s-TRIAZINE PHOSPHORIC ACID SALT (D)

| Plant | Compound D | | Compound A | Compounds D+A | |
|---|---|---|---|---|---|
| | 1 lb./a | 2 lbs./a | 1 lb./a | 1+1 lbs./a | 2+1 lbs./a |
| (a) | 0 | 0 | 0.1 | 1.5 | 1.5 |
| (b) | 0 | 0 | 0.3 | 2.0 | 3.0 |
| (c) | 0.5 | 2.0 | 1.4 | 2.5 | 2.5 |
| (d) | 0 | 0 | 1.6 | 3.0 | 3.0 |
| (e) | 1.0 | 2.5 | 0.1 | 3.0 | 3.0 |
| (f) | 1.5 | 2.0 | 0.1 | 2.5 | 3.0 |
| (g) | 0.5 | 1.5 | 0.4 | 2.0 | 2.0 |
| (h) | 0 | 0.5 | 1.3 | 2.0 | 2.0 | extender and one or more wetting and dispersing agents. The inert solid extenders are usually of mineral orgin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powders usually contain from about 5 to about 95 parts of active ingredient, from about 0.25 to about 25 parts of wetting agent, from about 0.25 to about 10 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense, finely divided particulate formulations which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powders and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 50 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil formulations generally contain from about 5 to 95 parts active ingredient, about 1 to 50 parts surfactant and about 4 to 94 parts solvent, all parts being by weight based on the total weight of emulsifiable oil.

Granules are physically stable particulate compositions comprising active ingredient adhering to or distributed through a basic matrix of inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as performed and screened particulate attapulgite or heat expended, particulate vermiculite, and the finely-divided clays such as kaolin clays, hydrated attapulgite or bentonitic clays. These extenders are sprayed or blended with the active ingredient to form the herbicidal granules.

The mineral particles which are used in the granular herbicidal formulations of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal formulations of this invention generally contain from about 5 parts to about 100 parts by weight of active ingredient per 100 parts by weight of clay and 0 to about 25 parts by weight of wetting agent per 100 parts by weight of clay. The preferred herbicidal granular formulations contain from about 10 parts to about 50 parts by weight of active ingredient per 100 parts by weight of clay.

The herbicidal formulations of this invention can also contain other additaments, for example, fertilizers, other phytotoxicants, pesticides and the like, used as adjuvant or in combination with any of the above-described adjuvants.

When operating in accordance with the present invention, herbicidally effective amounts of the active ingredients are dispersed in soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid herbicidal formulations to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the herbicides.

The application of an effective or herbicidal amount of active ingredient to the soil or growth media or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients distributed in the soil and the amount of rainfall as well as the specific active ingredient employed. In foliar treatment for the control or modification of vegetative growth, the active ingredients are applied in amounts from about 1 to about 50 or more pounds per acre. In applications to soil for the control or modification of the growth of viable propagules, dormant propagules, seedlings and established vegetation, the active ingredients are applied in amounts from about 1 to about 25 or more pounds per acre. In such soil applications, it is preferred that the active ingredients be used in amounts from about 1 to about 5 pounds per acre. It is believed that one skilled in the art can readily determine from this specification, including examples, the application rate for any specific situation.

The term "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but compost, manure, muck, humus, sand and the like, adapted to support plant growth.

I claim:
1. Method which comprises contacting a plant with a herbicidal amount of a composition comprising N-isopropyl-α-chloroacetanilide and a triazine selected from the group consisting of (1) 2,4 - bis(3 - methoxypropylamino) - 6 - methylthio - s - triazine, (2) 2,4-bis(isopropylamino) - 6 - methylthio - s - triazine, (3) 2,4 - bis(isopropylamino) - 6 - methylthio - s - triazine phosphoric acid salt, and (4) mixtures thereof, said triazine being present in an amount from about 1 to about 100 parts by weight per 10 parts by weight of N-isopropyl-α-chloroacetanilide.

2. Method of claim 1 wherein the triazine is 2,4-bis-(3-methoxypropylamino)-6-methylthio-s-triazine.

3. Method of claim 1 wherein the triazine is 2,4-bis-(isopropylamino)-6-methylthio-s-triazine.

4. Method of claim 1 wherein the triazine is 2,4-bis-(isopropylamino) - 6 - methylthio - s - triazine phosphoric acid salt.

5. Method of claim 1 wherein the triazine is present in an amount from about 1 to about 15 parts by weight per 10 parts by weight of the anilide.

6. Method of claim 1 wherein the triazine is present in an amount from about 15 to about 100 parts by weight per 10 parts by weight of the anilide.

7. Method of selectively controlling the growth of plants in the presence of crop plants which comprises applying to the area where said effect is desired an effective amount of a herbicidal composition comprising N-isopropyl-α-chloroacetanilide and a triazine selected from the group consisting of (1) 2,4 - bis(3 - methoxypropylamino) - 6 - methylthio - s - triazine, (2) 2,4-bis(isopropylamino) - 6 - methylthio - s - triazine, (3) 2,4 - bis(isopropylamino) - 6 - methylthio - s - triazine phosphoric acid salt, and (4) mixtures thereof, said triazine being present in an amount from about 1 to about 100 parts by weight per 10 parts by weight of N-isopropyl-α-chloroacetanilide.

8. Method of claim 7 wherein the triazine is 2,4-bis-(3-methoxypropylamino)-6-methylthio-s-triazine.

9. Method of claim 7 wherein the triazine is 2,4-bis-(isopropylamino)-6-methylthio-s-triazine.

10. Method of claim 7 wherein the triazine is 2,4-bis-(isopropylamino)-6-methylthio-s-triazine phosphoric acid salt.

11. Method of claim 7 wherein the growth of plants is selectively controlled pre-emergently by application of said herbicidal composition to soil.

12. Herbicidal composition comprising an effective amount of N-isopropyl-α-chloroacetanilide and a triazine selected from the group consisting of (1) 2,4-bis(3-methoxypropylamino) - 6 - methylthio-s-triazine, (2) 2,4-bis(isopropylamino) - 6 - methylthio - s - triazine, (3) 2,4 - bis(isopropylamino) - 6 - methylthio - s - triazine phosphoric acid salt, and (4) mixtures thereof, said triazine being present in an amount from about 1 to about 100 parts by weight per 10 parts by weight of N-isopropyl-α-chloroacetanilide.

13. Composition of claim 12 wherein the triazine is 2,4-bis(3 - methoxypropylamino) - 6 - methylthio - s - triazine.

14. Composition of claim 12 wherein the triazine is 2,4-bis(isopropylamino)-6-methylthio-s-triazine.

15. Composition of claim 12 wherein the triazine is 2,4-bis(isopropylamino) - 6 - methylthio - s - triazine phosphoric acid salt.

16. Composition of claim 12 wherein the triazine is present in an amount from about 1 to about 15 parts by weight per 10 parts by weight of anilide.

17. Composition of claim 12 wherein the triazine is present in an amount from about 15 to about 100 parts by weight per 10 parts by weight of anilide.

18. Composition of claim 12 together with a particulate solid adjuvant.

19. Composition of claim 12 together with a liquid adjuvant.

20. Composition of claim 12 together with a surface-active agent.

References Cited
UNITED STATES PATENTS

| | | |
|---|---|---|
| 2,863,752 | 12/1958 | Hamm et al. |
| 3,133,808 | 5/1964 | Hamm. |
| 3,185,561 | 5/1965 | Acker. |
| 3,257,192 | 6/1966 | Luckenbaugh et al. |
| 3,345,151 | 10/1967 | Olin. |

JAMES O. THOMAS, JR., *Primary Examiner.*